No. 659,081. Patented Oct. 2, 1900.
W. J. LLOYD.
VALVE FOR PNEUMATIC TIRES
(Application filed July 23, 1900.)
(No Model.)
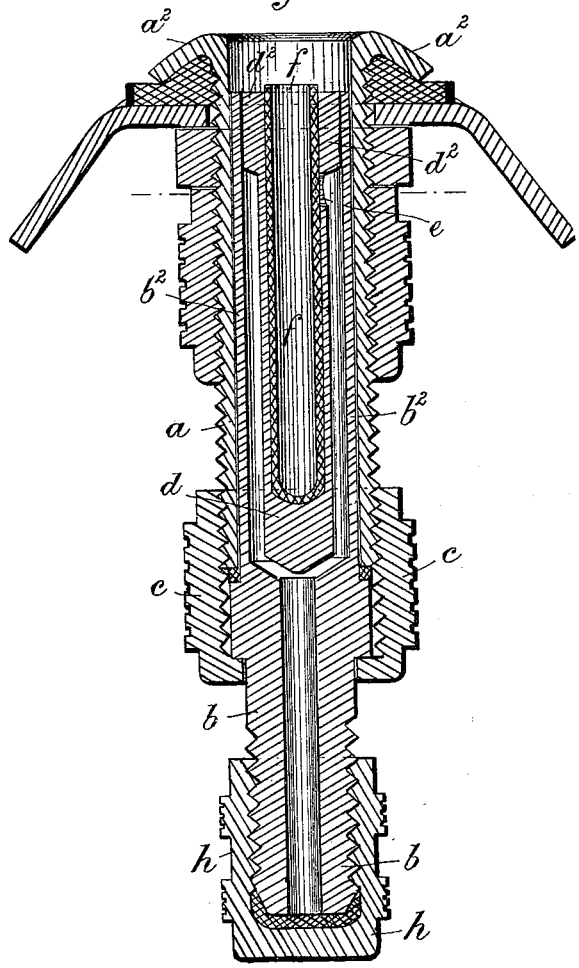
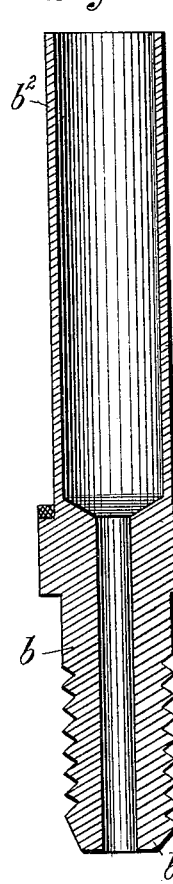
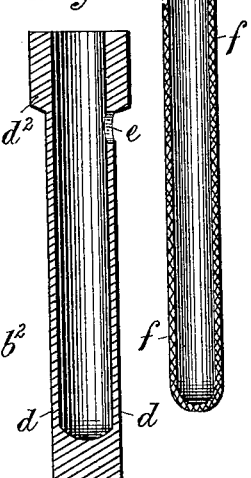
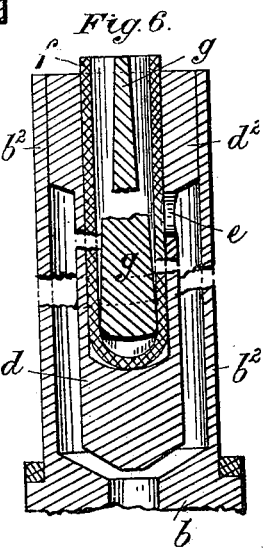
Witnesses:—
Richard Skerrett
Arthur John Powell
Inventor:—
Walter John Lloyd

UNITED STATES PATENT OFFICE.

WALTER JOHN LLOYD, OF BIRMINGHAM, ENGLAND.

VALVE FOR PNEUMATIC TIRES.

SPECIFICATION forming part of Letters Patent No. 659,081, dated October 2, 1900.

Application filed July 23, 1900. Serial No. 24,590. (No model.)

*To all whom it may concern:*

Be it known that I, WALTER JOHN LLOYD, a subject of the Queen of Great Britain, residing at Sheepcote street, Birmingham, England, have invented certain new and useful Improvements in Valves for the Pneumatic Tires of Velocipedes and other Vehicles and for other Purposes, of which the following is a specification.

My invention consists of the improvements hereinafter described in valves principally for the pneumatic tires of velocipedes and other vehicles, which improvements are applicable to valves for other purposes—such, for example, as valves for air-beds, air-cushions, pneumatic saddles, and the like.

The improvements constituting my invention have for their object to simplify the construction and arrangement of the parts of the said valves and to increase their efficiency.

I will describe my invention in connection with a valve for the pneumatic tire of a velocipede-wheel.

Figure 1 of the accompanying drawings represents in longitudinal vertical section, drawn to a large scale, and Fig. 2 in horizontal section, a valve constructed according to my invention. Figs. 3, 4, and 5 represent parts of the said valve detached. Fig. 6 represents a modification of or addition to the said valve hereinafter described.

Referring to Figs. 1 to 5, both inclusive, $a$ is the externally-screwed barrel or body of the valve, the inner end or head $a^2$ of which is attached to the air-tube of the tire and to the rim of the velocipede-wheel in the ordinary way, and $b$ is the stem or nozzle of the valve, (shown separately in Fig. 3,) which is secured to the outer end of the barrel or body $a$ by an internally-screwed union or coupling ring $c$, as usual. I make the nozzle $b$ with a plain inner end $b^2$, which passes into the barrel or body and terminates at or near the head $a^2$ of the said barrel or body. Into the plain inner end $b^2$ of the nozzle $b$ I fit a smaller tube $d$, (shown separately in Fig. 4,) closed at its outer end—that is, the end which is nearest the nozzle $b$ of the valve. The smaller tube $d$ is of a larger external diameter at its open end $d^2$ than at its other part, the larger end $d^2$ being of a diameter proper to fit tightly the inner end of the plain part $b^2$ of the nozzle-tube $b\ b^2$, and the external diameter of the other part of the said tube $d$ is such that there is formed when the tube $d$ $d^2$ is fitted in the part $b^2$ of the nozzle-tube $b\ b^2$ an annular chamber or air-space around the tube $d$. A fine hole $e$ or a series of fine holes is made in the tube $d$ at or near the larger end $d^2$. After the fitting of the tube $d$ into the nozzle-tube $b\ b^2$ the joined or fitted inner ends of the tubes are hermetically sealed, preferably by dipping them into liquid soft solder. In the tube $d$ a vulcanized india-rubber flap, lining, or tube $f$ (shown separately in Fig. 5) is arranged, the said lining when it takes the form of a tube being of a size proper to fit the tube $d$ internally.

I wish it to be understood that, although I have described and prefer to use india-rubber as the lining for the tube $d$, I do not limit myself to the use of an elastic material, as any flexible and non-porous material—such, for example, as gold-beaters' skin or oilskin—may be employed.

In the case of large valves the india-rubber lining $f$ may be held in place by a plug or taper pin $g$, as is illustrated in the arrangement shown in Fig. 6, the head or larger end of the taper pin being but slightly less than the internal diameter of the tube $d$. The plug or taper pin $g$, with the india-rubber lining $f$ thereon, is passed into the tube $d$ until the head of the plug or taper pin $g$ has reached or nearly reached the closed end of the said tube $d$, as is represented in Fig. 6.

The outer end of the nozzle $b$ is provided with a screw-cap $h$, as is usual in pneumatic valves.

The action of the valve is as follows: When an air-compressing pump or inflator is attached to the screwed end of the nozzle $b$ and worked, the compressed air is forced into the annular air-space or chamber around the tube $d$ and escapes therefrom into the tire by the fine hole $e$, the air under pressure lifting the india-rubber lining $f$ out of contact with the tube $d$ and passing between the said hole $e$ and the inner end or mouth of the valve. The non-return of the air is insured by the internal pressure of the air in the tire, which preserves the lining $f$ in close contact with the tube $d$.

The application of my invention to valves for air-inflated articles other than tires differs in no essential respect from its application to the valve of a pneumatic tire, as hereinbefore described and represented.

Having now described my invention, what I claim as new, and desire to secure by Letters Patent, is—

An air-valve for pneumatic tires and the like consisting essentially of a barrel or body attached to the tire or other article to be inflated and a nozzle secured to the barrel or body by a screwed union or coupling ring the said nozzle having a plain inner end taking into the barrel or body in which plain inner end a smaller tube lined internally with india-rubber or other flexible and non-porous material and closed at its outer end is so fitted as to leave an annular air-space or chamber between the said smaller tube and the plain end of the nozzle the said chamber communicating with the interior of the valve by a fine hole (or holes) in the smaller tube which fine hole is normally closed by the india-rubber or other flexible and non-porous lining of the said tube substantially as herein set forth and shown.

In testimony whereof I have hereunto set my hand in presence of two subscribing witnesses.

WALTER JOHN LLOYD.

Witnesses:
RICHARD SKERRETT,
ARTHUR JOHN POWELL.